No. 888,824. PATENTED MAY 26, 1908.
I. P. B. KNUDSEN.
MEANS FOR LUBRICATING RAPIDLY REVOLVING VERTICAL SHAFTS.
APPLICATION FILED AUG. 22, 1907.
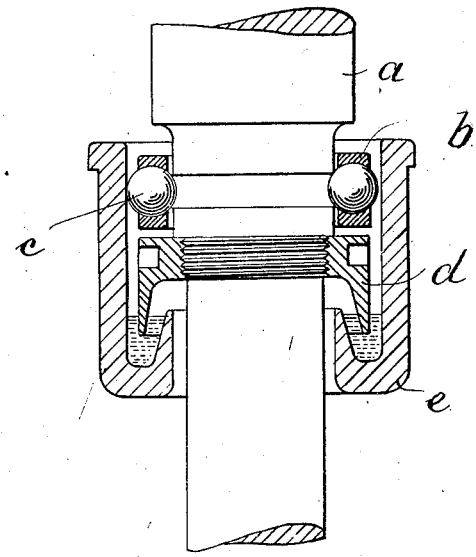
Witnesses
Jos. F. Collins
L. E. Scott.
Inventor
Ivar Peter Bagger Knudsen
By
Emil Bonnelycke
Attorney

UNITED STATES PATENT OFFICE.

IVAR PETER BAGGER KNUDSEN, OF COPENHAGEN, DENMARK.

MEANS FOR LUBRICATING RAPIDLY-REVOLVING VERTICAL SHAFTS.

No. 888,824.　　　Specification of Letters Patent.　　　Patented May 26, 1908.

Application filed August 22, 1907. Serial No. 389,694.

*To all whom it may concern:*

Be it known that I, IVAR PETER BAGGER KNUDSEN, a subject of the King of Denmark, residing at No. 56 Svammöllevej, in the city of Copenhagen and Kingdom of Denmark, have invented certain new and useful Improvements in the Means for Lubricating Rapidly-Revolving Vertical Shafts, of which the following is a specification.

It is usually very difficult to efficiently lubricate vertical shafts which rotate at a high speed in consequence of the oil being thrown off from the rotating parts by centrifugal action.

This objection is obviated by the present invention which enables the centrifugal action to be utilized for the purpose of conveying the lubricant to the revolving parts which consequently receive constant lubrication.

The invention is illustrated in the accompanying drawing, which shows a vertical section of the lubricating device for the ball bearing of a rapidly rotating vertical shaft.

$a$ is the shaft which rotates in contact with the balls $c$ carried by the ball bearing $b$.

$d$ is an inverted cup screwed to the shaft beneath the ball bearing, the lip of the cup dipping into the oil contained by a stationary vessel $e$ constituted by an annular channel surrounding the shaft and having an outer wall which is prolonged upwards to inclose the ball bearing $b$. When the shaft $a$ and with it the inverted cup $d$ is caused to revolve rapidly, the oil in the vessel $e$ is also caused to revolve with the result that the centrifugal action set up in the oil causes the latter to pass upwards over the inner surfaces of the outer wall of the vessel $e$ so as to constantly lubricate the balls $c$.

Having now described and ascertained the nature of my said invention and in what manner the same is to be performed I declare that what I claim is:

1. In a machine having a rapidly rotating vertical shaft, a bearing for said shaft and a stationary annular oil vessel arranged below the bearing and having its outer wall prolonged to inclose said bearing, a member fixed to said shaft below the bearing and dipping into the oil contained in the vessel in such manner that when the shaft rotates the oil will be set in rotation and by the centrifugal action be forced up along the inner surface of the outer wall of the oil vessel and effect a constant lubrication of the bearing.

2. In a machine having a rapidly rotating vertical shaft, a bearing for said shaft, and a stationary annular oil vessel arranged below the bearing and having its outer wall prolonged to inclose said bearing, an inverted cup fixed to the shaft beneath the bearing and having its lip dipping into the oil contained in the vessel in such a manner that when the shaft rotates the oil will be set in rotation and by the centrifugal action be forced up along the inner surface of the outer wall of the oil vessel and effect a constant lubrication of the bearing.

In witness whereof I have hereunto set my hand in presence of two witnesses.

IVAR PETER BAGGER KNUDSEN.

Witnesses:
　MARCUS DÖLLER,
　E. HANSEN.